M. S. REILEY.
VALVE.
APPLICATION FILED JULY 3, 1920.
1,392,354.
Patented Oct. 4, 1921.
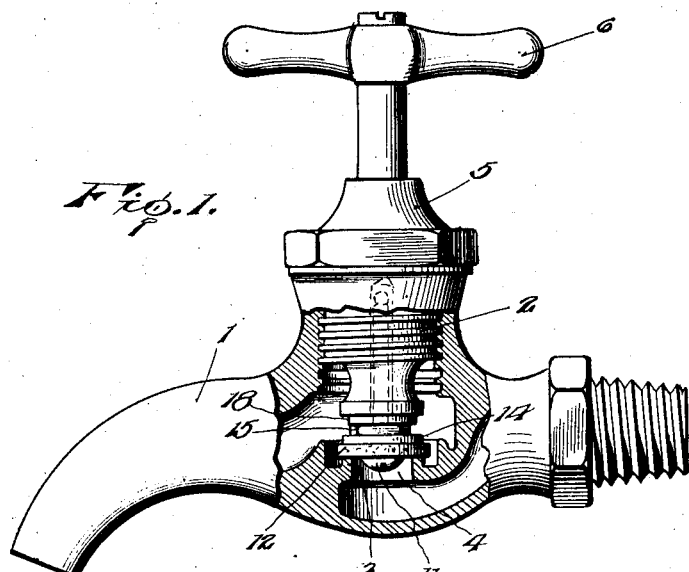
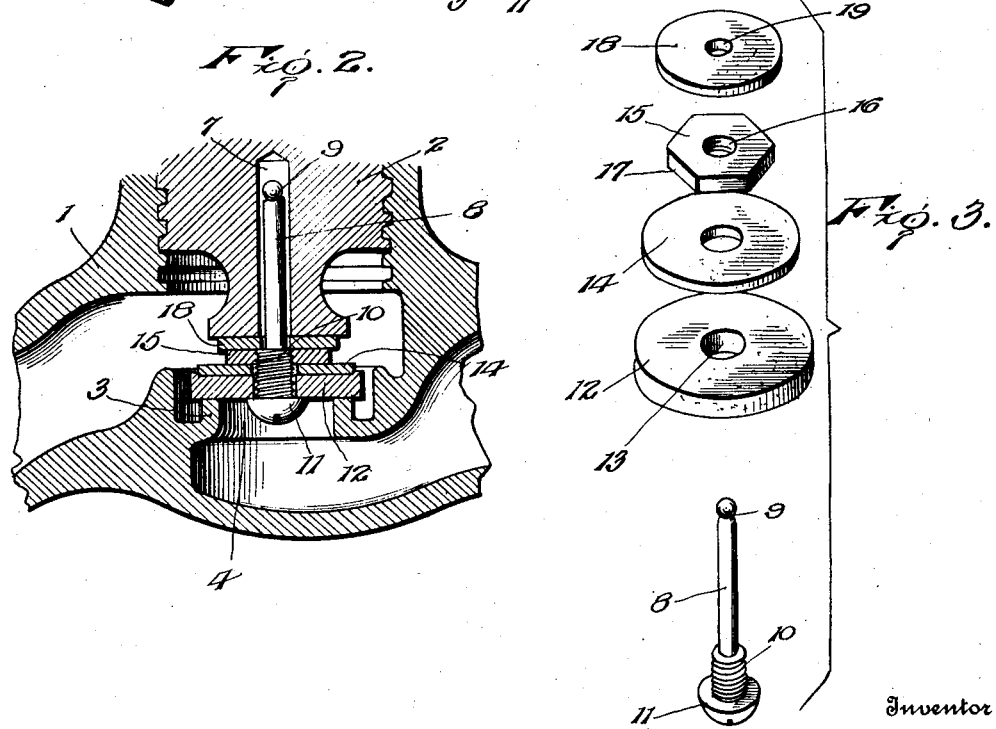
Inventor
Matthew S. Reiley.
By
Lacey & Lacey, Attorneys

# UNITED STATES PATENT OFFICE.

MATTHEW S. REILEY, OF OCEAN PARK, CALIFORNIA.

VALVE.

1,392,354. Specification of Letters Patent. Patented Oct. 4, 1921.

Application filed July 3, 1920. Serial No. 393,809.

*To all whom it may concern:*

Be it known that I, MATTHEW S. REILEY, a citizen of the United States, residing at Ocean Park, in the county of Los Angeles and State of California, have invented certain new and useful Improvements in Valves, of which the following is a specification.

This invention relates to the valves employed in kitchen faucets of that type which are especially designed to minimize the wear upon the flexible washer, the object of the present invention being to facilitate the removal and renewal of the washer when necessary. The invention is illustrated in the accompanying drawings and will be hereinafter fully described, the novel features being specifically pointed out in the appended claim.

In the drawings—

Figure 1 is a sectional elevation of a kitchen faucet having my present invention embodied therein;

Fig. 2 is an enlarged longitudinal section through the faucet and the valve;

Fig. 3 is a perspective view showing the parts of the valve separated but approximately in their proper relative positions.

In the drawings, the reference numeral 1 indicates a kitchen faucet body of the usual construction and 2 designates a rotary shank which is threaded into the body so as to have a rotary longitudinal movement therein toward and from the seat 3 surrounding the port 4. The shank 2 is normally held against withdrawal from the faucet body by a bonnet 5 of the usual construction and above the said bonnet a handle 6 of any convenient or preferred form is secured upon the upper extremity of the shank. In the lower end of the shank is formed a central longitudinal cylindrical bore or socket 7 which is adapted to receive the spindle 8 of the valve so that the valve will be properly centered relative to its seat, but it is to be understood that the spindle is not connected with or directly engaged by the shank so that while the valve may move to or from its seat under variations of the pressure thereon it does not rotate and the shank may move independently of the valve. The spindle 8 is provided at its upper end with an annular groove or notches 9 whereby it may be engaged by any convenient lifting tool so as to be withdrawn from the faucet body when repairs are necessary and the lower portion of the spindle is enlarged and exteriorly threaded, as shown at 10, the lower extremity of the spindle being expanded to from a head 11 which may be engaged by a turning tool. The valve proper comprises a washer 12 of rubber or fiber which is preferably circular and of such diameter as to extend over and rest upon the seat 3, as will be readily understood and as shown in Figs. 1 and 2. The washer is, of course, provided with a central opening 13 through which the enlarged lower portion of the spindle 8 may pass and resting upon the said washer is a metallic washer or clamping plate 14 which has smooth plane faces. Above the plate 14, a nut 15 is provided and this nut has a central threaded opening 16 which is adapted to be engaged by the exterior threads 10 of the spindle so that when the spindle is turned home the washer 12 will be securely clamped between the head of the spindle and the plate 14. The nut 15 is of a polygonal exterior configuration whereby it is provided with a plurality of flat faces or seats 17 so that it may be readily engaged and held in a wrench or vise to facilitate the separation of the parts when renewal of the flexible washer is necessary. The lower extremity of the shank 2 is smooth and flat so that there will not be excessive wear between the said surface and the surface with which it contacts and in order to further reduce the wear, I interpose a wear plate 18 which is preferably a metallic disk having smooth flat faces and having a central opening 19 of a diameter larger than the diameter of the spindle 8. As shown clearly in Fig. 2, this wear plate is arranged between the nut 15 and the end of the shank 2 so that the shank does not come in contact with the nut and any tendency of the wear plate to follow the rotation of the shank will be resisted by the frictional contact between the plate and the nut and, consequently, the turning force will be counteracted and so reduced that it will not be strong enough to impart rotation to the nut and the washer clamped against the same.

From the foregoing description, taken in connection with the accompanying drawings, it will be seen that I have provided an exceedingly simple valve which will wear for an indefinite period without requiring renewal of the flexible washer. The rotation of the shank is not transmitted to the washer but the closing movement of the shank simply applies a compressing force to the washer so that it will be firmly seated and will cut off the flow through the port 4, there being no rotation of the washer and consequently no cutting away of the same by the surface of the valve seat. When an opening movement is imparted to the valve shank 2, the pressure of the liquid in the faucet will lift the valve so that the liquid may escape through the faucet outlet but inasmuch as the valve is provided with a spindle extending loosely into the shank the axial position of the valve relative to its seat will be maintained. Should it be necessary after long-continued use to renew the flexible washer, the shank 2 is withdrawn from the valve body after the flow of water is cut off in the manner now commonly practised. The spindle may then be lifted from the faucet body so as to withdraw the valve and the wear plate. If all the surfaces of all the parts were circular it would be difficult to obtain such a firm grip upon the nut or the washer as to prevent the same turning with the spindle when a screw driver or other turning tool was applied thereto and manipulated. However, by providing the nut 15 with its flat faces, said nut may be readily engaged in and held by a vise or wrench so that the spindle may be quickly withdrawn from the nut by the application of an ordinary screw driver. Obviously, when the spindle has been thus released the washers will be separated therefrom so that a new washer may be applied in an instant.

Having thus described the invention, what is claimed as new is:

A device for the purpose set forth comprising a spindle having its lower portion enlarged and exteriorly threaded, an annular head at the lower end of said spindle, a flexible washer fitted about the lower portion of the spindle and against the head thereof, a rigid washer fitted loosely upon the spindle and resting upon the flexible washer, a polygonal nut engaged upon the threaded portion of the spindle whereby the washers may be clamped between said nut and the head of the spindle, and a smooth faced wear plate fitted loosely about the spindle and resting upon the nut, said wear plate being adapted to engage loosely against the lower end of a rotatable valve shank and said spindle being adapted to loosely fit within a central longitudinal socket in the end of said valve shank whereby the shank may rotate about or move longitudinally on the said spindle without imparting motion to the spindle.

In testimony whereof I affix my signature.

MATTHEW S. REILEY. [L. S.]